United States Patent [19]
Horton

[11] Patent Number: 5,955,386
[45] Date of Patent: Sep. 21, 1999

[54] FIRE HYDRANT THERMAL AND ACOUSTIC INSULATION MATERIAL

[76] Inventor: Bill D. Horton, 417 W. Bentrup St., Chandler, Ariz. 85224

[21] Appl. No.: 09/199,746

[22] Filed: Nov. 25, 1998

[51] Int. Cl.⁶ ..................................... B32B 27/24
[52] U.S. Cl. .............. 442/138; 442/65; 442/70; 442/74; 442/377; 442/388; 442/393; 427/209; 427/385.5; 427/389.9; 427/392; 427/393.3
[58] Field of Search .................. 442/64, 65, 70, 442/74, 136, 138, 381, 388, 393, 378; 427/209, 385.5, 389.9, 392, 393.3

[56] References Cited

U.S. PATENT DOCUMENTS

5,232,976  8/1993  Horacek et al. .................. 524/495
5,384,188  1/1995  Lebold et al. .................... 428/283

Primary Examiner—Christopher Raimund
Attorney, Agent, or Firm—Cahill, Sutton & Thomas, PLC

[57] ABSTRACT

An open weave, air permeable fiber pad is formed from a plurality of compressed, interlocked fiber strands. A non-uniform, three dimensional grid of spaced apart, expandable graphite particles are secured at randomly spaced apart intervals to individual fiber strands with a particle distribution density sufficient to form a barrier to air flow through a defined area of the fiber pad when exposed to a source of heat causing the expandable graphite particles to be converted from their normal volume to a heat-activated, substantially expanded volume.

19 Claims, 6 Drawing Sheets

FIRE HYDRANT THERMAL AND ACOUSTIC INSULATION MATERIAL

BACKGROUND OF THE INVENTION

1. Field of the Invention

This invention relates to fire retardant materials, and more particularly to fire retardant thermal and acoustic insulation materials.

2. Description of the Prior Art

The term "non-woven textile clipping pad" refers to a relatively thin, highly flexible pad material fabricated from recycled scrap fabric and carpet remnants used for applications such as mattress pads, furniture pads and carpet pads. This material can be described as an open weave, air permeable fiber pad formed from a plurality of compressed, interlocked fiber strands having a generally uniform thickness with non-uniform first and second side surfaces which are defined by a plurality of exposed, interlocked strands.

A layer of aluminum foil or an aluminized polyester sheet can be bonded to one or both sides of the fiber pad material to create a product which reflects heat and high frequency sound and has the capability of absorbing or attenuating low frequency sounds. The aluminum layers enhance the heat reflective and heat insulating properties of the fiber pad material rendering it potentially useful for automotive or aircraft sound reduction and heat insulating applications.

The pad material is fabricated from a wide variety of chopped, slashed, recycled scrap including cotton and cotton/polyester fabrics where the length of the resulting chopped fiber strands as well as the material composition and individual strand diameter results in a flexible, relatively strong pad material but with a highly non-homogeneous, non-uniform composition.

In an effort to meet the fire retardancy standards mandated by the Federal Aviation Administration (FAA) for use in private and commercial aircraft, by the U.S. Coast Guard for use in private and commercial water craft and by the Department of Transportation for use in private and commercial vehicles and by various local and federal agencies for use in the construction of homes and commercial buildings, attempts have been made to render this highly flammable pad material both flame and fire retardant.

A commercially available liquid fire retardant sold under the trademark AMSPERSE FR-21 has been coated onto the exterior surface of this pad material and has been injected into the pad material in an effort to enhance the fire resistance characteristics of the flammable pad material. Because the pad includes widely varying percentages of recycled nylon, rayon, cotton, polyester and related materials and because the length and diameter of the various fiber strands vary widely, the addition of liquid AMSPERSE fire retardant chemical to the pad material somewhat reduced its flammability but the pad material still burns and emits smoke, but at a slower rate than for untreated pad material. Even though consistent amounts of the chemical flame retardant was added to the pad material during its manufacture, inconsistent test results were obtained during the course of burn testing due to the non-homogeneous, widely varying nature of the recycled fiber materials and wide variations in the relative ratios of different categories of recycled fiber input materials.

Requests to supply pad compositions having a more uniform fiber content were rejected by the pad manufacturers as economically impractical as a result of the requirement that all of the randomly varying recyclable input materials be utilized. While treatment of the pad material with chemical flame retardants somewhat reduced its flammability, some, but not nearly all, fire retardant standards could be met by pad material treated with AMSPERSE fire retardant.

After lengthy research and development efforts, and although aluminum foil coated pad materials yielded highly advantageous thermal and acoustic insulation properties, non-woven textile clipping pad could not be modified to achieve a high level of resistance to fire and flame.

SUMMARY OF THE INVENTION

It is therefore a primary object of the present invention to provide a fire retardant thermal and acoustic insulation material which can be manufactured at low cost, which demonstrates a high level of acoustic and thermal insulation and which represents an essentially flame-proof, self-extinguishing material.

Yet another object of the present invention is to provide a fire retardant thermal and acoustic insulation material which can be covered with a layer of aluminum foil to substantially enhance the thermal and acoustic insulating properties of the material.

Yet another object of the present invention is to provide a fire retardant thermal and acoustic insulation material which can be manufactured using existing pad manufacturing equipment at high speed and at relatively low cost.

Still another object of the present invention is to provide a fire retardant thermal and acoustic insulation material in which sequential layers of pad material and aluminum foil can be laminated together to achieve substantially enhanced thermal and acoustic insulating properties.

Briefly stated, and in accord with one embodiment of the invention, a fire retardant thermal and acoustic insulation material is fabricated from an open weave, air permeable fiber pad formed from a plurality of compressed, interlocked fiber strands. The fiber pad includes a generally uniform thickness with non-uniform first and second side surfaces defined by a plurality of exposed, interlocked strands. A first non-uniform three dimensional grid is created from a plurality of spaced apart, expandable graphite particles. The expandable graphite particles possess a normal volume and a heat-activated, substantially expanded volume. The grid is defined by a plurality of expandable graphite particles bonded at randomly spaced apart intervals to individual fiber strands with a particulate distribution density sufficient to form a barrier to air flow through a defined area of the fiber pad. The air flow barrier is created when the defined area of the fiber pad is exposed to a source of heat and the expandable graphite particles within that area are activated to convert individual particles from the normal volume to the expanded volume.

The process of manufacturing the fire retardant thermal and acoustic insulation material begins with the step of forming an open weave, air permeable fiber pad by arranging a plurality of fiber strands into layers and by combining a series of layers into a single mat. The first and second side surfaces of the pad are then compressed to reduce the pad thickness. At least one side of the compressed pad material is injected with a pressurized mixture of a liquid bonding material and expandable graphite particles to produce a first region of fiber strands which had been wetted by the liquid bonding agent. Because the liquid bonding agent has been mixed with expandable graphite particles, injecting that mixture into the pad material yields a predetermined distribution density of expandable graphite particles. The pad is then dried to extract the liquid from the liquid bonding material to thereby bond the fiber strands into a compressed, interlocked state to yield a pad having a generally uniform thickness with non-uniform first and second side surfaces defined by a plurality of exposed, interlocked strands. The drying step further bonds the expandable graphite particles to the fiber strands and creates a first, non-uniform, three-dimensional grid of spaced apart particles with a particle distribution density sufficient to form a barrier to air flow through a first defined area of the fiber pad when that defined area is exposed to a source of heat causing the expandable graphite particles to be activated and converted from the normal volume to the expanded volume.

DESCRIPTION OF THE DRAWINGS

The invention is pointed out with particularity in the appended claims. However, other objects and advantages together with the operation of the invention may be better understood by reference to the following detailed description taken in connection with the following illustrations, wherein:

DESCRIPTION OF THE PREFERRED EMBODIMENT

In order to better illustrate the advantages of the invention and its contributions to the art, a preferred embodiment of the invention will now be described in detail.

A basic element of the fire retardant and acoustic insulating material of the present invention represents a standard, mass-produced product known in the field as a "non-woven textile clipping pad." Such products are commercially available from Leggett & Platt of Nashville, Tenn. as well as from other pad manufacturing companies. This pad material can be described as a non-woven, air permeable fiber pad manufactured from scrap fiber materials such as fabric scrap and carpet remnants. The garment industry, including companies such as Haines, Fruit of the Loom, and Levi, represents the primary source of fabric scrap which results from manufacturing overruns, rejected finished product and miscellaneous scrap materials. Such fibrous scrap materials predominantly include cotton and cotton/polyester blends, but can also include nylon, rayon and related fiber materials. The raw material input to the textile clipping pad manufacturer varies widely as to both fiber category (cotton, polyester, rayon and nylon) as well as with respect to the physical properties of the fiber strands including strand diameter, thread count, thread color and thread density.

The fiber input material is typically delivered to the textile clipping pad manufacturer in five hundred pound bales which are initially processed and mixed in large bins and are then fed to chopping and shredding machines which convert the fiber-based input materials into a light, fluffy material consisting of loosely linked fiber strands of variable, but generally short lengths.

Figure 8:
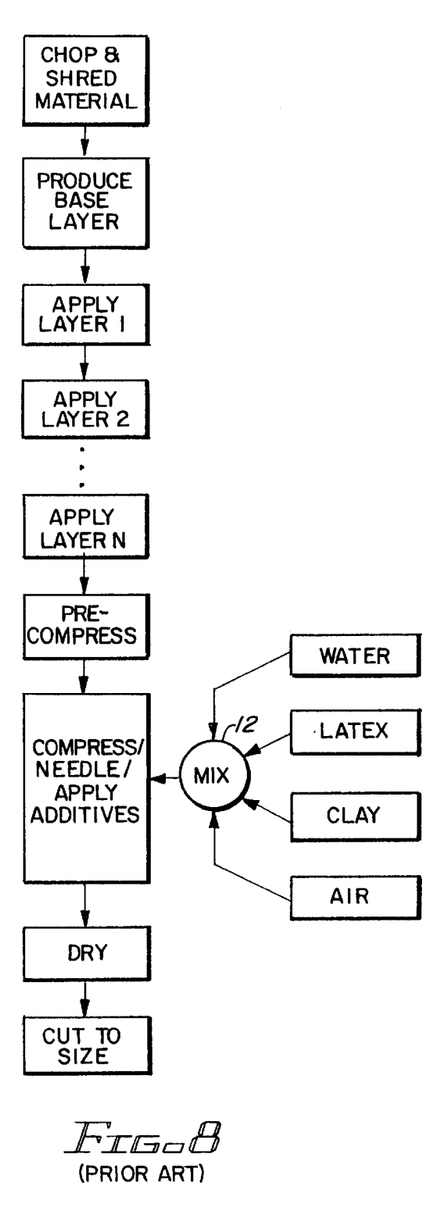
FIG. 8 represents a flow chart depicting a prior art process for manufacturing non-woven textile clipping pad.

The FIG. 8 flow chart generally describes the prior art process for manufacturing non-woven textile clipping pad. As shown after the chopping and shredding step, a series of fluffy layers of fiber strands are superimposed to create a relatively thick (several inches thick), layered, loose fluffy material. The fluffy material is transported by conveyor belts through a combing and light compressing process until a sufficient thickness of fibrous fluffy material has been stacked together to yield a standard pad density, typically twenty-seven to thirty-six ounces per square yard.

The FIG. 8 flow chart next illustrates that the fiber stranded material is then directed to a standard compression/needling/foam injection fixture 10 where a controlled mixture of water, latex, finely ground clay filler and pressurized air is mixed in mixing chamber 12 and routed to a manifold structure 14 having a plurality of needles 16, a matching plurality of needle receiving apertures 18 and a laterally offset plurality of foam injection nozzles 20.

The liquid based latex/clay slurry mixture is injected through upper and lower the surfaces of clipping pad 22 to effectively saturate the various fiber strands with the foam slurry. Fixture 10 is typically configured to provide a needle density of about one thousand needles per square foot. The needling process assists in compressing pad 22 while simultaneously mechanically bonding adjacent, independent fiber strands to each other to enhance the mechanical strength of the resulting clipping pad 22. The thickness of the resulting pad is controlled by a variety of parameters, but principally by the weight density of the fluffy, layered fiber strand material which is passed into the input side of fixture 10.

As reflected by the FIG. 8 flow chart, the material transferred from the output side of fixture 10 is routed to a drying oven which removes the water from clipping pad 22 causing the latex bonding material to cure to yield clipping pad 22 including a plurality of compressed, interlocked fiber strands which are both mechanically interlocked by the needling process as well as bonded together by the latex bonding agent.

The clipping pad produced according to the prior art process illustrated in the FIG. 8 flow chart represents a relatively flammable material which, upon ignition, is completely burned in a relatively short period of time. When a conventional liquid fire retardant chemical such as AMSPERSE fire retardant is either injected into clipping pad 22 through fixture 10 or is painted onto the exterior surfaces of the pad, the overall fire retardant properties of the pad material are enhanced only to a limited degree. Specific testing of clipping pad material treated with AMSPERSE chemical fire retardant only reduced the rate of combustion of the pad material, but did not render it either self-extinguishing or flameproof.

Referring now to the modified FIG. 9 flowchart and FIGS. 1–7, modification of the prior art FIG. 8 process as explained below achieved a dramatic improvement in the ability of clipping pad 22 to resist direct flame and to ultimately self extinguish any smouldering or burning pad material by creating an air flow barrier on the outer region of the pad which converts the open weave, air permeable fiber pad within that depth region into an air impermeable, self-extinguishing material.

Figure 9:
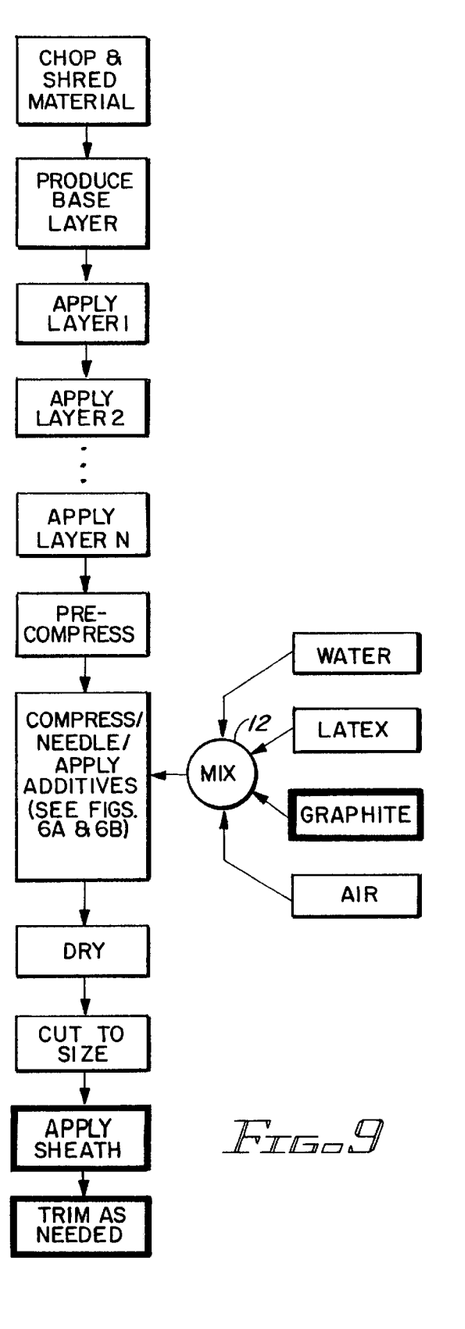
FIG. 9 represents a flow chart illustrating various changes and modifications to the FIG. 8 prior art process.

As illustrated in the FIG. 9 flow chart, the water/latex/clay recipe used to manufacture prior art clipping pad material is modified by introducing eighty-eight pounds of expandable graphite particles as a substitute for two hundred pounds of clay. The mixture of water, latex and expandable graphite is continuously stirred to create a relatively uniform slurry.

Figure 6A:
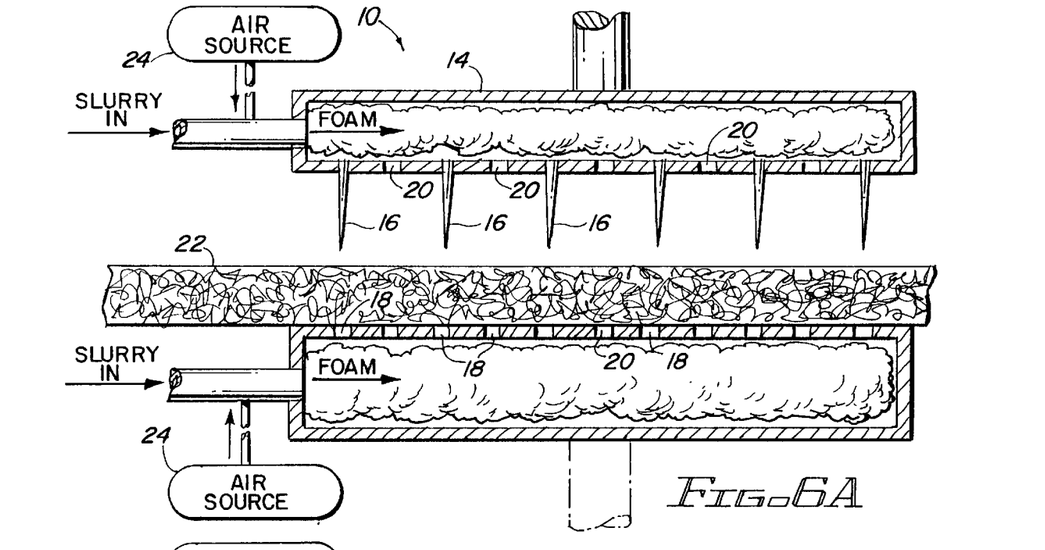
FIG. 6A illustrates the open weave, air permeable fiber pad being routed through a fixture for compressing and needling the pad while simultaneously injecting a foamed slurry into the mat.
Figure 6B:
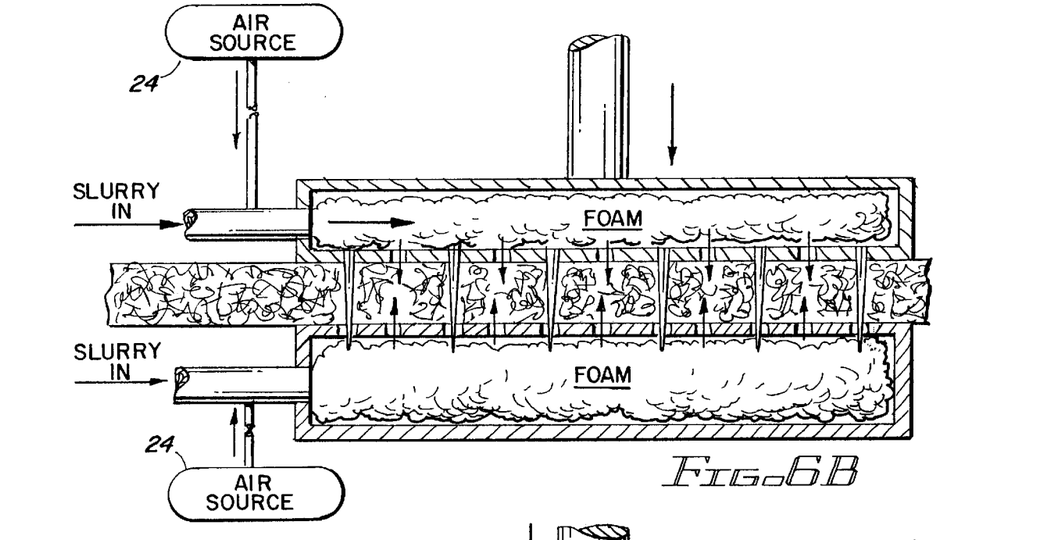
FIG. 6B illustrates the fixture shown in FIG. 6A in the active state where the steps of compressing, needling and foam injection are being performed.
Figure 7:
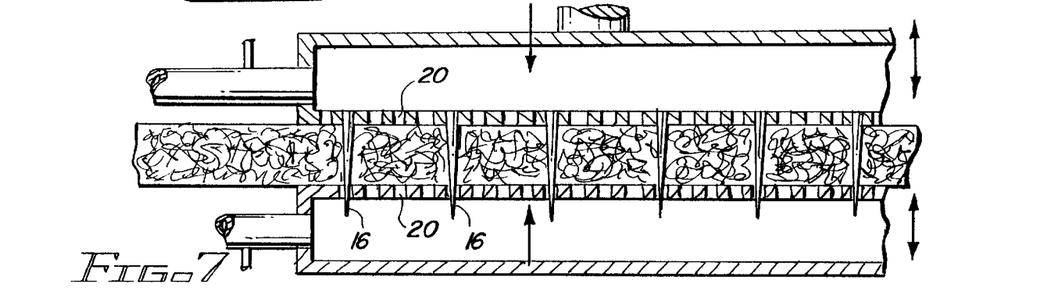
FIG. 7 illustrates the equipment shown in FIGS. 6A and 6B after the foam injection step has been completed.

Referring now to FIGS. 6 and 7, this latex/expandable graphite slurry (with or without additional clay) is directed to compression/needling/foam injection fixture 10 which, when activated as shown in FIG. 6B, brings manifold members 14 together. Air source 24 is then activated to generate a bubbly foam material within manifold 14. Typically, expandable graphite particles are injected by the pressurized foam into the upper surface of clipping pad 22 with significant concentrations to within a distance of from one thirty-second to one sixteenth of an inch below the surface. Lower concentrations of expandable graphite particles may be injected more deeply below the surface of pad material 22 with particle density decreasing as a function of distance from the pad source, but it has been found that full thickness injection of expandable graphite particles has not been required to achieve the fire retardant, self-extinguishing properties required for commercial aircraft applications. The foam mixture may be injected through the upper surface of the pad through the lower surface of the pad, or through both the upper and lower surfaces of the pad.

Following the foam injection process described above, pad 22 is routed to the drying oven shown in the FIG. 9 flowchart where water is removed from the pad causing the latex bonding material to cure.

Figure 1:
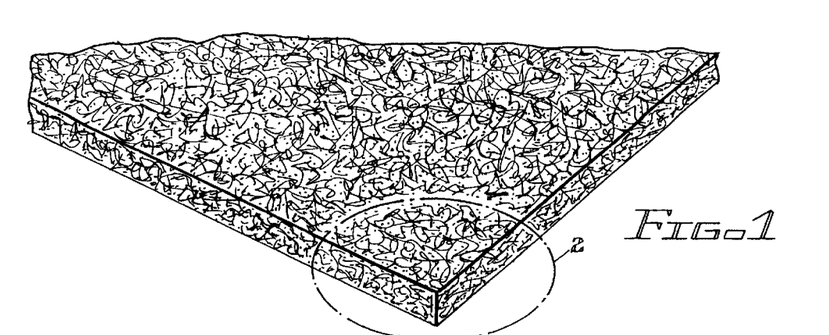
FIG. 1 represents a partially cutaway perspective of a fire retardant thermal and acoustic insulation material.
Figure 2:
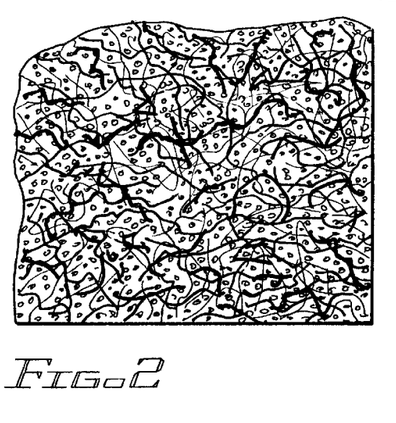
FIG. 2 represents a view from above of the insulation material shown in FIG. 1 lying within the area designated by section line 2.
Figure 3:
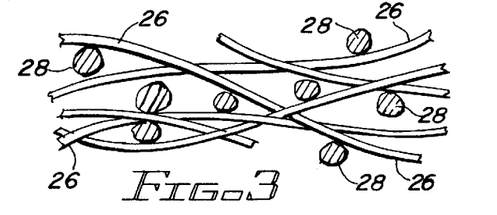
FIG. 3 represents a highly expanded, simplified sectional view of the insulation material illustrated in FIG. 1 showing the manner in which fiber strands and expandable graphite particles have been formed into a compressed, interlocked state.
Figure 4:
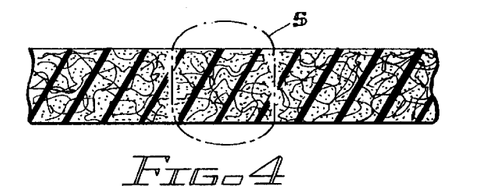
FIG. 4 represents a partially cutaway sectional view of the insulation material illustrated in FIG. 1.

FIG. 3 symbolically illustrates a small, highly magnified section of the non-woven, air permeable fiber pad after having been compressed and after the latex bonding material has been cured to form a plurality of crosslinked and interlocked fiber strands defining a non-uniform open structural lattice. As illustrated in FIG. 3, a series of fiber strands 26 of varying length, varying diameter and typically of different material (cotton, polyester, rayon, nylon, etc.) have been compressed into the layered, interlocked configuration shown and are held together first by the mechanical needling process and second by the bonding effect provided by the cured latex bonding agent. In the random distribution of expandable graphite particles 28 illustrated in FIG. 3, the individual particles 28 are surrounded by a protective coating of cured latex as a result of the foam injection process described above.

Figure 5A:
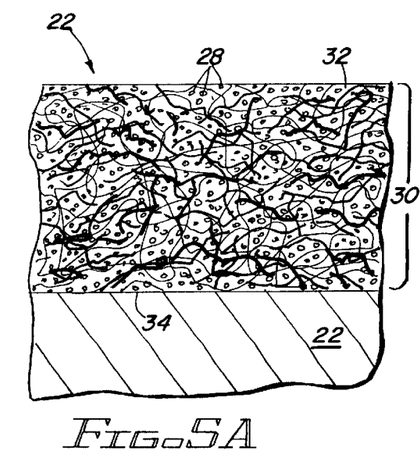
FIG. 5A represents a partially cutaway sectional view of the insulation material illustrated in FIG. 4 within the area designated by section line 5 showing the expandable graphite particles in their normal volume state.
Figure 18:
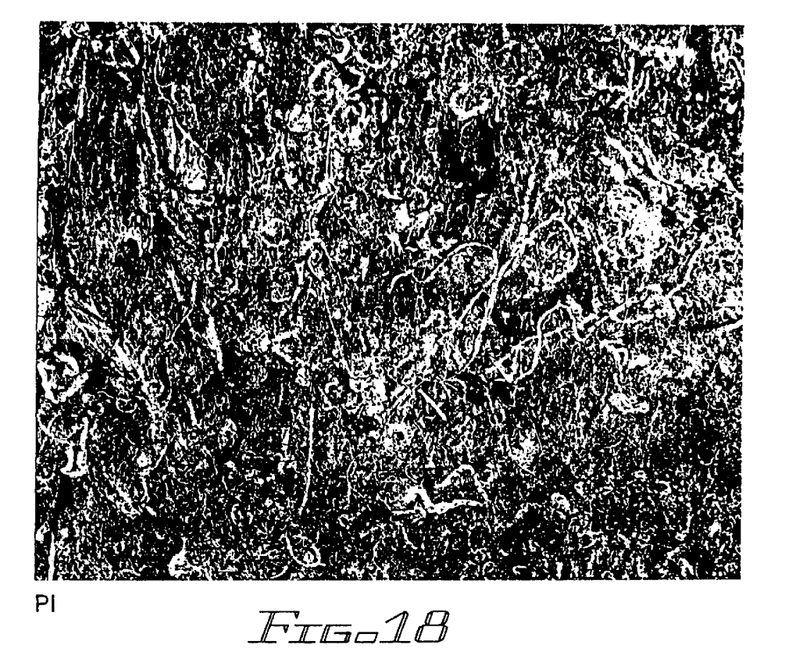
FIG. 18 and FIG. 19 represent an enlarged photographic view from above and an enlarged photographic view from the side of an actual specimen of a fire retardant thermal and acoustic insulation material embodying the present invention.
Figure 19:
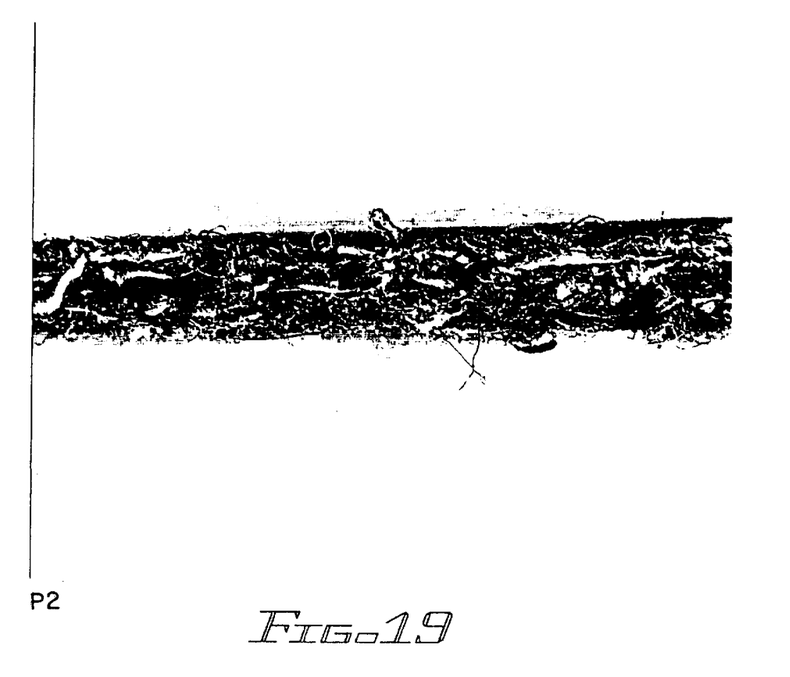

In the resulting fire retardant pad product as illustrated in FIGS. 3 and 5A, clipping pad 22 includes a non-uniform, three dimensional grid 30 of spaced apart, expandable graphite particles 28 extending from pad outer surface 32 to an inner boundary 34. In FIG. 5A, particles 28 are shown in their normal volume. In the preferred embodiment of the invention, the expanded graphite particles are rated at a mesh size of eighty (eighty percent probability) with a significant percentage of smaller particles. Photographic FIGS. 18 and 19 illustrate the non-uniform, three dimensional grid of expandable graphite particles (black, sand-like particles) in an actual clipping pad specimen.

By use of the specific foam injection and needling mechanisms illustrated in FIGS. 6 and 7, the particle distribution density either remains relatively constant between boundaries 32 and 34 or decreases as a function of distance or spacing from outer surface boundary 32. While lower boundary 34 has been referred to by the term "boundary," persons of ordinary skill in the art will readily recognize that numerous expandable graphite particles will be injected to a depth well below lower boundary 34 but at a substantially reduced particle concentration or density.

Figure 11:
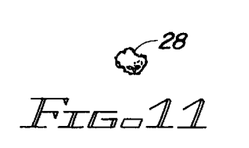
FIG. 11 illustrates a single particle of expandable graphite in its normal volume state.
Figure 12:
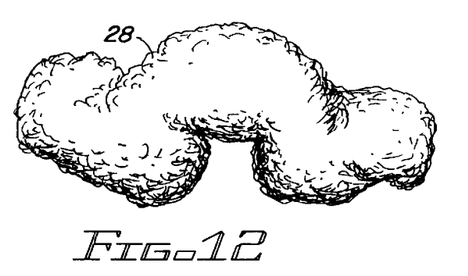
FIG. 12 illustrates a single particle of expandable graphite in its heat-activated, substantially expanded volume form.

The expandable graphite used in implementing the preferred embodiment of the invention was purchased from the Alumina Trading Company of Parkridge, N.J. The preferred product is identified by grade 9980200 which is rated as having a maximum expansion volume of two hundred milliliters per gram. Such expandable graphite particles typically expand in volume one hundred and twenty-five times their original volume at a temperature of five hundred degrees Fahrenheit to as large as one hundred and eighty times their original volume when exposed to temperatures of one thousand degrees Fahrenheit. The typically flake-like or sand-like particles of expandable graphite upon exposure to an adequate amount of heat expand from their normal manufactured volume as illustrated in FIG. 11 to their heat-actuated, substantially expanded volume and thereby assume an accordion-like or worm-like shape as generally illustrated in FIG. 12.

Figure 5B:
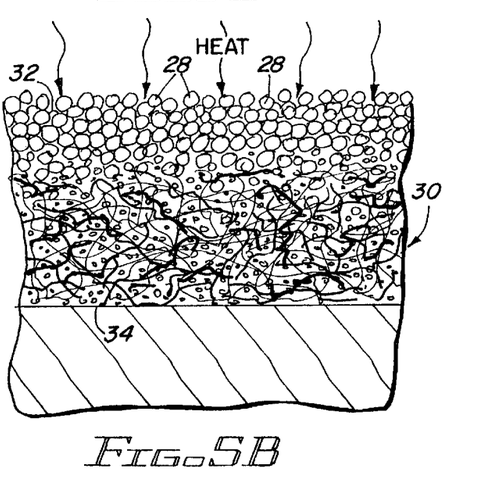
FIG. 5B represents a partially cutaway sectional view of the insulation material illustrated in FIG. 4 within the area designated by section line 5 showing the expandable graphite particles in their heat-activated, substantially expanded volume.

As symbolically illustrated in FIG. 5B, the heat activation of expandable graphite particles 28 transforms heated particles from the normal volume into their substantially expanded volume state throughout the area of grid 30 which receives an amount of heat energy sufficient to increase the temperature of the particles to their heat activation temperature. The heat activated, expandable graphite particles expand from their widely spaced apart, normal volume as illustrated in FIGS. 3 and 5A into their heat-activated, substantially expanded volume as illustrated in FIG. 5B creating a physical or mechanical barrier to air flow throughout the entire surface area and depth of the fiber pad which is exposed to heat and includes an adequate concentration and distribution of graphite particles. The formation of this air impermeable barrier cuts off the supply of oxygen required for combustion to the pad fiber strands which have been heated beyond their point of ignition and very promptly causes these fiber strands to self-extinguish.

In practice, exposure of the surface of clipping pad 22 produced according to the present invention to an open flame creates a charred surface giving off a low volume of light smoke which four seconds after removal of the direct source of flame completely self-extinguishes, terminating the source of smoke. The pad chars, but does not normally burn.

The very stringent FAA flame test requires that a fire retardant material self-extinguish within fifteen seconds after removal of the flame source with a burn length not exceeding eight inches during that fifteen second interval to qualify that material for use in commercial passenger aircraft. The expandable graphite-treated pad manufactured according to the present invention by manifesting a four second self-extinguishing property readily meets the extremely stringent FAA flame test.

To substantially enhance the thermal and acoustic insulating properties of the present invention, the outer surface 32 of clipping pad 22 is typically covered with a layer of aluminum foil 36 typically having a thickness of one mil or two mils with one mil being preferred. Depending on the application of pad 22, aluminum foil layer 36 is bonded to the outer surface 32 of pad 22 by a high temperature adhesive where the temperature rating of the adhesive is selected according to the particular application of the insulation material. For the highest rated FAA-type insulation material, a special four hundred degree rated adhesive produced by the Fiber-Resin Corporation of Chatsworth, Calif. and designated by Model No. FR7127 is typically used to provide high temperature rated bonding between foil layer 36 and pad 22. For less stringent fire resistance ratings, lower temperature rated adhesives available at lower cost can readily be procured and used to serve the same aluminum foil to pad bonding function.

Figure 13:
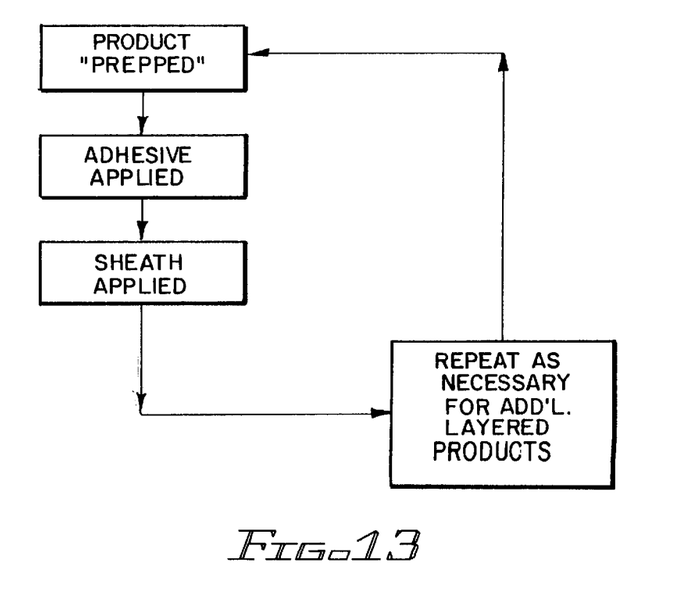
FIG. 13 represents a flow chart illustrating a method for creating a multiple layer, aluminized fire retardant thermal and acoustic insulation material.

FIG. 13 represents a flow chart illustrating the relatively straightforward process for adhesively bonding aluminum foil or sheeting layer 36 to pad 22 involving the spray application of adhesive to the exposed surfaces of pad material 22 and the aluminum foil sheet 36 before bonding the aluminum to the pad. Alternatively, a heat activated adhesive procured in rolled sheet form may be placed between the exposed surface of pad 22 and aluminum foil sheet 36 with the adhesive being subsequently heat-activated by appropriate equipment well known to those skilled in the art. For medium temperature applications an adhesive rated for temperatures on the order of two hundred and eighty to three hundred degrees Fahrenheit may be used instead of the high temperature rated four hundred degree Fahrenheit adhesive described above.

Figure 10:
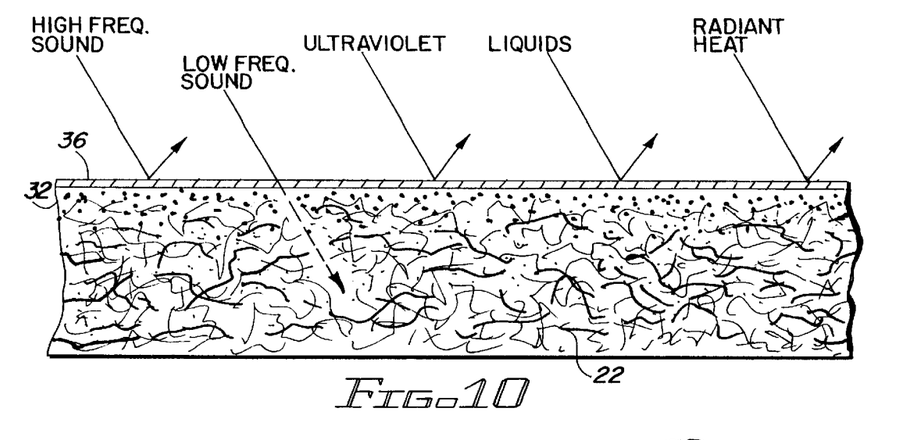
FIG. 10 represents a partially cutaway fire retardant thermal and acoustic insulation material showing how it either reflects or absorbs high frequency sound, low frequency sound, ultraviolet rays, liquids and radiant heat.

FIG. 10 illustrates that aluminum foil 36 serves to provide an acoustic insulating function by reflecting high frequency sound as well as a thermal insulating function by reflecting ultraviolet rays and radiant heat rays. The open weave, air permeable structure of fiber pad 22 receives and significantly attenuates low frequency sound as well as providing significant acoustic attenuation.

Figure 14:
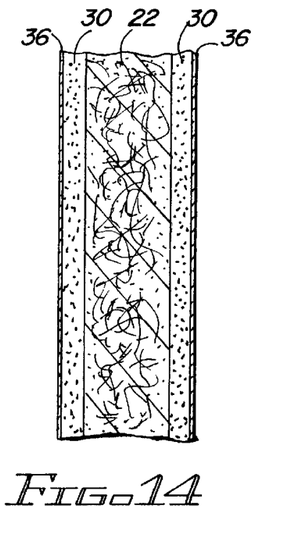
FIG. 14 represents a partially cutaway sectional view of a fire retardant thermal and acoustic insulation material including first and second spaced apart, non-uniform, three-dimensional grids of expandable graphite particles as well as first and second spaced apart aluminum foil exterior layers.

FIG. 14 illustrates a pad material including a grid 30 of spaced apart expanded graphite particles injected into both exterior surfaces of pad 22 in combination with a pair of opposing aluminum foil sheets 36 to significantly increase the fire retardant thermal and acoustic insulation properties of the single-sided insulation material illustrated in FIG. 10.

Figure 15:
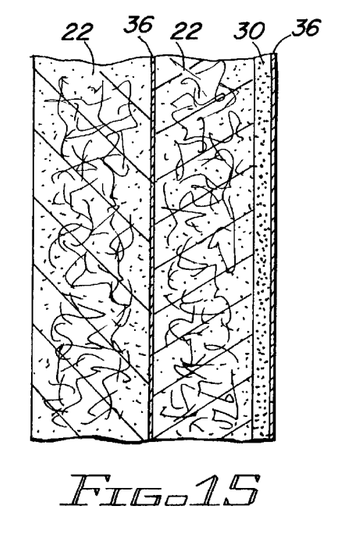
FIG. 15 represents a partially cutaway sectional view of a fire retardant thermal and acoustic insulation material including a single non-uniform three-dimensional grid of expandable graphite particles, two layers of fiber pad and two layers of aluminum foil.

FIG. 15 illustrates a laminated embodiment of the insulation material of the present invention including two thicknesses of pad 22, a single grid of expandable graphite particles 30 and two spaced apart layers of aluminum foil.

Figure 16:
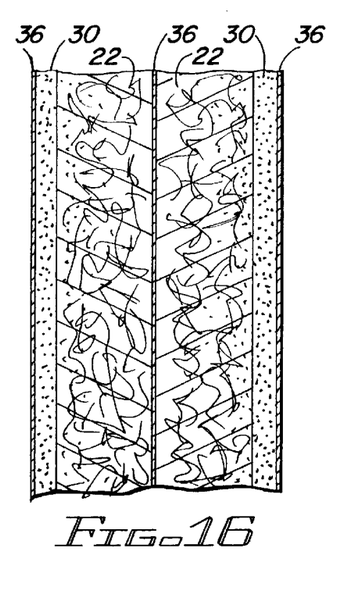
FIG. 16 represents a partially cutaway sectional view of a fire retardant thermal and acoustic insulation material including first and second three-dimensional grids of expandable graphite particles, two laminated fiber pads and three layers of aluminum foil.

FIG. 16 represents an enhanced version of the FIG. 15 laminated insulation material having three layers of aluminum foil and a pair of grids of expanded graphite material 30 in proximity to both exposed outer surfaces of the overall material product.

Figure 17:
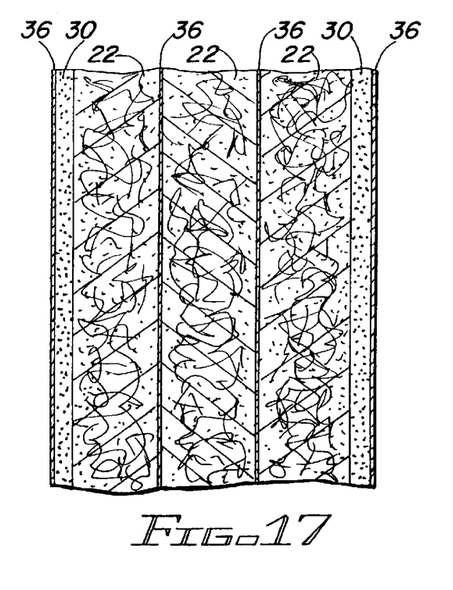
FIG. 17 represents a partially cutaway sectional view of a fire retardant thermal and acoustic insulation material including first and second three dimensional grids of expandable graphite particles, three layers of fiber pad and four layers of aluminum foil.

FIG. 17 represents a three layer laminated insulation material including four layers of aluminum foil 36 and a pair of opposing grids 30 of expandable graphite particles in combination with three pads 22.

The thickness of the pad material of the present invention can vary widely, but typically the FIG. 14 embodiment of the invention is manufactured with a thickness on the order of five sixteenths to three eights of an inch. The FIG. 15 embodiment of the invention includes an overall thickness of on the order of three quarters to seven eighths of an inch consisting of a first layer of seven sixteenths of an inch and a second layer of five sixteenths to three eights of an inch. The FIG. 16 embodiment of the invention includes an overall thickness of approximately five eights to three quarters of an inch, while the FIG. 17 embodiment of the invention includes a thickness of from about seven eighths to about one inch.

The fire retardant thermal and acoustic insulation material of the present invention in its most challenging application can be used to provide thermal and acoustic insulation between the interior surface of a pressurized commercial airliner fuselage and the aircraft cabin. The single layer insulation material of the present invention with dual aluminum layers provides a high order of thermal insulation while providing substantial acoustic insulation between the aircraft fuselage and the aircraft cabin while simultaneously providing a relatively fire resistant, self-extinguishing barrier between the exterior and interior surfaces of the aircraft fuselage.

The fire retardant thermal and acoustic insulation material of the present invention can also be used as a fire retardant mattress pad, as a fire retardant furniture pad or as a fire retardant carpet pad. For multi-story buildings, especially multi-story apartment buildings, the enhanced fire resistance provided by the insulation material of the present invention when used as a carpet pad not only significantly reduces the transmission of sounds from one level of the building to another, but also provides a meaningful additional period of time before a fire on an upper floor penetrates through the ceiling into an adjacent, lower floor. Such additional time provides apartment occupants with additional time to escape.

For mattress pad and furniture pad applications, the self-extinguishing property of the insulation material of the present invention may prevent a cigarette-induced burn from turning into a fire, or may at least delay the onset of a fire.

While the preferred process for manufacturing the fire retardant thermal and acoustic insulation pad of the present invention has been described in connection with injecting a predetermined concentration of expandable graphite particles through and below the exterior surface of an open weave, air permeable fiber pad, meaningful fire retardant performance may also be provided by painting or otherwise providing an exterior coating of expandable graphite particles in a latex base onto the non-uniform first and second side surfaces defined by the plurality of exposed, interlocked fiber strands of the pad material. The highest level of superior performance is achieved, however, when the expandable graphite particles are injected below the non-uniform surface or surfaces of the pad material.

While the upper and lower limits of the optimum expandable graphite concentration has not yet been determined, the test for an adequate concentration and depth of expandable graphite particles is primarily an empirical one based on testing and the observation of effective, meaningful fire retardant results. For aircraft applications, the specific formulation has been addressed above where two hundred pounds of clay is replaced by eighty-eight pounds of expandable graphite particles. The dried pad material includes approximately ten to seventeen percent weight concentration of clay, expandable graphite and latex. Approximately a three to five weight percent concentration of expandable graphite particles is presently preferred, with approximately a two weight percent concentration believed to represent the minimum effective weight concentration. Visual observation indicates an estimated particle density of approximately two hundred particles per square inch. For less rigorous, non-aircraft applications, lower concentrations of expandable graphite particles could be implemented until the fire retardant characteristics achieved by the present invention has been reduced below a minimum acceptable threshold. For FAA commercial airline applications, subsequent testing may very well establish that even lower concentrations than the eighty-eight pound expandable graphite formula described above may meet the FAA fifteen second flammability test parameters.

While the present invention has been described in connection with the utilization of one mil, ninety-nine percent pure aluminum sheets, less significant benefits may be achieved by utilizing one mil or thinner aluminized reflective sheets of Mylar polyester adhesively bonded to one or both surfaces of the insulation material of the present invention.

Once the insulation material of the present invention has been exposed to a level of heat sufficient to activate the expandable graphite particles, the entire activated area of the insulation material should be cut out and replaced. The expandable graphite particles, once activated, remain in the expanded volume state permanently.

The fire retardant thermal and acoustic insulation material according to the present invention may also be produced by means of an alternative dry process rather than the wet process described above. This alternative dry process yields an improved form of the product described above and is based on a modified version of a method used by Bonded Logic, Inc. of Chandler, Ariz. for manufacturing conventional non-woven textile clipping pad commonly referred to as "carpet pad" having the standard composition discussed above. The details of the prior art dry process carpet pad manufacturing method remains a closely guarded Bonded Logic trade secret the specifics of which have not been disclosed to the present inventor.

In producing its conventional carpet pad product, Bonded Logic reprocesses a standard, commercially available cotton and synthetic fiber waste material consisting of a mixture of polyester and cotton that ranges from fifty percent polyester and fifty percent cotton to seventy percent polyester and thirty percent cotton. This standard recycled scrap product is generally available from numerous sources including Los Angeles Fiber, Inc. of Vernon, Calif. The cotton and synthetic waste material is combined and processed together with a copolyolefin bicomponent fiber which functions as a binder fiber and which is a standard fiber product commercially available from the Hoechst Celanese Corporation of Charlotte, N.C. The Hoechst copolyolefin bicomponent fiber is more specifically identified in Material Safety Data Sheet No. L36077 originally published on May 6, 1991 and revised on Apr. 16, 1996.

The conventional Bonded Logic carpet pad may also be purchased with a fire retardant additive consisting of an unknown ratio of ammonia sulphate and boric acid which are dissolved and added to the partially processed carpet pad product.

In manufacturing its conventional carpet pad product, Bonded Logic uses a proprietary process where the shredded cotton and synthetic fiber waste product is blended with the copolyolfin bicomponent fibers in an air blower chamber utilizing multi-directional air flows to facilitate a thorough mixture of the various dissimilar fiber components. The blended fiber output from the air blower chamber is distributed onto a conveyer belt in the form of a relatively loose, low density uncompressed and hence relatively thick pad of blended fibers. The uncompressed, low density pad or mat is then transferred via conveyer belt to an oven where it is heated in the presence of heated air currents. The output of the oven is transferred via conveyer belt to a roller for final compression. The resulting semi-rigid compressed product is cut into rolls of standard commercial grade three eighths inch carpet pad product.

To manufacture the fire retardant thermal and acoustic insulation material of the present invention utilizing the prior art Bonded Logic dry carpet pad manufacturing process, an appropriate concentration of expandable flake graphite is blended or intermingled with the fibers processed by Bonded Logic to produce a somewhat non-uniform or non-homogeneous physical distribution of expandable graphite particles throughout the width and thickness dimensions of the finished carpet pad. This desired result can be achieved by various means which would be readily apparent to persons of ordinary skill in the art. For example, an appropriate concentration of expandable graphite particles could be mechanically intermixed or blended with the shredded cotton and synthetic fiber waste product or with the shredded copolyolefin bicomponent fiber or could be mechanically intermixed or blended with the blended mixture of those two fiber components either during their initial blending process within the blower chamber or at a subsequent time before those component fiber materials are finally compressed into the relatively high density three eighths inch commercial fiber pad product. Numerous ways of achieving such a result would be readily apparent to persons of ordinary skill in the art.

The following formulas represent the preferred formulations for the fire retardant thermal and insulation material according to the present invention when prepared for use as an aircraft grade product or for use as a less expensive standard grade product:

| RATIO BY WEIGHT FOR AIRCRAFT GRADE | | |
|---|---|---|
| 1. | Cotton/synthetic fiber mixture | 52% |
| 2. | Binder fiber | 20% |
| 3. | ammonia sulfate/boric acid mixture | 20% |
| 4. | Expandable flake graphite | 8% |
| RATIO BY WEIGHT FOR STANDARD GRADE | | |
| 1. | Cotton/synthetic fiber mixture | 63% |
| 2. | Binder fiber | 20% |
| 3. | ammonia sulfate/boric acid mixture | 15% |
| 4. | Expandable flake graphite | 2% |

As explained above, the standard grade product represents a somewhat less flame resistant, lower cost product more suitable for use in mattress pad and furniture pad applications, building wall and ceiling applications, carpet pad applications or any other application where either thermal or acoustic insulation or isolation is either desirable or beneficial or where a fire resistant or fire retardant characteristic would be useful or beneficial.

As explained above, the concentration of expandable flake graphite can vary widely depending on the selected end use and may vary from a concentration of from as low as about a two percent weight concentration to about a thirty weight percent concentration, a level substantially in excess of the preferred eight weight percent concentration for aircraft grade applications.

The preferred form of expandable grade graphite is specified as having a two hundred and fifty cubic centimeter per gram expandable rate with a particle size specified as eighty-four percent on eighty mesh. Such products are generally commercially available in the industry or from Non-Metals, Inc. of Tucson, Ariz.

The ammonia sulfate/boric acid fire retardant mixture utilized in the preferred formulations as noted above represents a conventional, relatively low cost but not highly effective fire retardant material. That conventional fire retardant mixture provides a measurable, but limited enhancement in the fire retardant characteristics of the prior art commercially available carpet pad product and represents an optional component of the fire retardant thermal and acoustic insulation material of the present invention.

When the present intention is implemented by using the dry carpet pad manufacturing process of the type developed by Bonded Logic, the irregularly shaped expandable flake graphite particles are for the most part retained or locked into a non-uniform, three-dimensional grid primarily by mechanical means resulting from the mechanical compressive forces created by the compressed, linked together individual fibers of the carpet pad. The compressed, linked together fiber configuration arises immediately after the oven heating/roller compression steps of the carpet pad manufacturing process have been completed. At least a portion of the expandable flake graphite particles may be maintained in a fixed grid position by being bonded to the copolyolefin bicomponent binder fiber rather than by being mechanically retained by interference contact between the irregular exterior surface of the graphite flakes and nearby compressed fibers. While the dry process carpet pad can be mechanically delaminated and flexed to release a portion of the mechanical bond securing the expandable flake graphite particles, such mishandling of the product results in the loss of only an essentially inconsequential number of expandable flake graphite particles from the carpet pad fibers. The irregular shape and fibrous configuration of the compressed, high density fiber content of the carpet pad taken together with the irregular exterior contours of the expandable flake graphite particles themselves facilitate and maintain the mechanically interlocked relationship between the non-homogeneous fiber content of the carpet pad with the irregular exterior flake configuration of the graphite particles to yield a highly integrated mechanical bonding effect between individual graphite particles and the nearby groups of individual pad fibers.

Visual inspection of the resulting dry process fire retardant thermal and acoustic insulation material of the present invention reveals a generally uniform volume concentration of expandable flake graphite particles within any reasonably sized selected volume unit (e.g., one cubic centimeter or larger) of the resulting fiber pad product although the individual graphite flake particles are distributed and locked or mechanically bonded into what can best be described as a non-uniform, three-dimensional grid of spaced apart particles. In other words, on either a surface area basis or on a three-dimensional volume basis, any given area segment or any given volume segment will have more than a sufficient number or concentration of non-uniformly distributed expandable flake graphite particles to render the relevant area or volume of the open weave, air permeable fiber pad material highly fire retardant and fire resistant.

The effectiveness of the non-uniform mechanical distribution of expandable flake graphite particles within the dry process carpet pad product has been verified by Federal Aviation Administration (FAA) specified certification tests of the type described above. Both the wet process as well as the dry process embodiments of the present invention have passed the FAA specified fifteen second flame test which is required as a condition for use of such products in commercial and general aviation class aircraft.

The dry processed fire retardant thermal and acoustic insulation material of the present invention can best be described as a semi-rigid, but still relatively flexible and formable fiber pad material. When laminated with one or two mil aluminum sheets on either one or both exterior surfaces, the resulting laminated or sandwiched material becomes significantly more rigid, but still maintains a degree of flexibility or formability acceptable for use on curved surfaces as well as on flat surfaces. As described above, the laminated material can be processed as a multi-layer laminated material as was illustrated in connection with FIGS. 14–17, except that for the dry processed product, the distribution of expandable flake graphite particles is, on a volume concentration basis, substantially uniform throughout the entire thickness dimension of the product because the graphite particles are distributed and blended throughout the fiber materials before the fibers are heated and compressed into the commercial pad product. It is believed that this more homogeneous distribution of expandable flake graphite particles throughout all three dimensions of the carpet pad material will substantially enhance its effectiveness as a fire retardant material.

Currently the dry process manufactured fire retardant thermal and acoustic insulation material is being manufactured in three eighths inch thick pad material which can be laminated on its exterior surfaces with one or two mil aluminum sheets and further laminated with additional pad layers to fabricate multiple layer, laminated or sandwiched pad products having a single layer of pad, two layers of pad, or three layers of pad. As a result of this laminating or sandwiching technique, a fire retardant pad material of any desired thickness can be fabricated to achieve various fire retardant properties, thermal insulation properties as well as acoustic insulation properties.

Tests on the acoustic insulating properties of the present invention have demonstrated substantial sound attenuation characteristics for even the single layer embodiment of the present invention. Utilization of laminated aluminum sheets on both exterior surfaces of the single layer material contributes significantly to the acoustic attenuating properties of the pad of the present invention. The acoustic attenuating performance of the present invention is enhanced at a geometric rate as multiple laminated pads are laminated together.

It will be readily apparent to those skilled in the art that the disclosed fire retardant thermal and acoustic insulation material may be modified in numerous ways and may assume many embodiments other than the preferred forms specifically set out and described above. For example, the dry manufacturing process described above could be modified to utilize other forms of primary fiber components or other types of binder materials rather than a synthetic fiber binder. For example, a latex binder material, either wet or dry, could be utilized in combination with the dry process to implement the process of the present invention. Similarly, the ammonia sulfate/boric acid conventional fire retardant additive could either be reduced in concentration or completely eliminated without substantially adversely affecting the surprising fire retardant thermal and acoustic insulating properties achieved by the present invention. The thickness of the fiber pad itself could either be substantially reduced or substantially increased beyond the conventional three eighths inch carpet pad thickness for use in connection with various different applications. A varying concentration of the expandable flake graphite particles could also be implemented to achieve various different levels of fire retardant performance. For example, the particle concentration may be increased toward either the center of the pad material or toward the outer surface or the particle distribution configuration could be implemented as a concentration gradually increasing from one pad surface to the opposite pad surface to maximize the fire retardant properties on one side as opposed to the other side of the material. All such modifications and variations of the present invention would be readily apparent to persons of ordinary skill in the art. Accordingly, it is intended by the appended claims to cover all such modifications of the invention which fall within the true spirit and scope of the invention.

I claim:

1. A fire retardant thermal and acoustic insulation material comprising:

a. a non-woven fiber pad formed from a plurality of crosslinked and interlocked fiber strands defining a non-uniform open structural lattice and having a length, a width and a generally uniform thickness with first and second substantially planar side surfaces defined by a plurality of exposed, interlocked strands; and b. a first non-uniform open three-dimensional grid of spaced apart, expandable graphite particles secured in place at randomly spaced apart intervals within the structural lattice by the crosslinked and interlocked fiber strands, wherein the particle grid includes a non-uniform particle spacing with a particle to particle distribution density sufficient to form a fire retardant barrier to air flow across a defined region of the fiber pad when that defined region is exposed to a source of heat and the expandable graphite particles within that region are heat-activated to convert individual particles from the normal volume to the expanded volume.

2. The fire retardant thermal and acoustic insulation material of claim 1 wherein the open three-dimensional grid of spaced apart, expandable graphite particles includes a substantially uniform particle distribution density across the pad thickness dimension.

3. The fire retardant thermal and acoustic insulation material of claim 1 wherein the expandible graphite particles contact and are mechanically secured to the compressed crosslinked and interlocked fiber strands forming the open structural lattice.

4. The fire retardant thermal and acoustic insulation material of claim 1 further including a fire retardant solution coating the fiber strands.

5. The fire retardant thermal and acoustic insulation material of claim 4 wherein the fire retardant solution includes an ammonia sulfate and boric acid mixture.

6. The fire retardant thermal and acoustic insulation material of claim 4 wherein the fiber strands include cotton and synthetic fiber waste.

7. The fire retardant thermal and acoustic insulation material of claim 6 wherein the fiber waste includes from about fifty percent polyester and about fifty percent cotton fiber concentrations to about seventy percent polyester and about thirty percent cotton fiber concentrations.

8. The fire retardant thermal and acoustic insulation material of claim 6 wherein the fiber strands further include a binder fiber.

9. The fire retardant thermal and acoustic insulation material of claim 8 wherein the binder fiber further includes a bicomponent fiber.

10. The fire retardant thermal and acoustic insulation material of claim 9 wherein the bicomponent fiber includes a copolyolefin bicomponent fiber.

11. In a non-woven textile clipping pad having an exterior surface and being formed from a plurality of fiber strands maintained in an interlocked configuration by a binder material to define an open air permeable structural lattice, the improvement comprising:

a. forming an open three-dimensional grid of spaced apart expandable graphite particles by securing the particles to the interlocked fiber strands defining the open structural lattice at randomly spaced apart intervals to yield a particle to particle distribution density sufficient to form a fire resistant barrier to airflow through a defined section of the pad when that defined section is exposed to a source of heat and the expandable graphite particles within that section are heat-activated to convert individual particles from a normal volume to a heat-activated, substantially expanded volume.

12. The non-woven, textile clipping pad of claim 11 wherein the fiber pad includes first and second side surfaces defining a pad thickness and wherein the pad thickness is not substantially increased as a result of exposure of the defined section of the grid to the heat source and conversion of the exposed particles in that section from the normal particle volume into the expanded particle volume.

13. The non-woven, textile clipping pad of claim 12 wherein the fiber pad includes first and second substantially planar side surfaces defining a pad thickness and wherein a substantial portion of the fiber strands defining the first and second side surfaces extend in a direction substantially parallel to the plane of the side surfaces.

14. The non-woven, textile clipping pad of claim 13 wherein the the binder material includes a copolyolefin bicomponent fiber.

15. A method for making a fire retardant thermal and acoustic insulation material comprising the steps of:
   a. blending together strands of cotton and synthetic fiber waste material with strands of a fiber binder material to yield a low density non-woven air permeable fiber pad having first and second opposing side surfaces;
   b. mixing a predetermined quantity of expandable graphite particles with the low density fiber pad;
   c. heating the low density fabric pad and compressing the first and second side surfaces to bond the fiber strands into an open interlocked non-uniform structural lattice to produce a higher density, air permeable fiber pad having a three-dimensional grid of spaced apart expandible graphite particles secured in place at randomly spaced apart intervals within the lattice by the interlocked fiber strands, wherein the particle grid includes a non-uniform particle spacing with a particle to particle distribution density sufficient to form a fire resistant barrier to airflow across a defined section of the fiber pad when that defined section is exposed to a source of heat and the expandable graphite particles within that section are heat-activated to convert individual particles from the normal volume to the expanded volume.

16. The method of claim 15 wherein the fiber pad includes a thickness and wherein the expandable graphite particles are relatively uniformly intermingled with the low density fiber pad across the pad thickness.

17. The method of claim 16 including the further steps of bonding a first layer of metallic foil to the first side surface of the higher density fiber pad and bonding a second layer of metallic foil to the second side surface of the higher density fiber pad to create a laminated pad.

18. The method of claim 15 wherein the thickness of the higher density fiber pad is not substantially increased by heat-activated expansion of the particles.

19. The method of claim 15 wherein the side surfaces of the higher density fiber pad define substantially parallel surfaces and the portions of the fiber strands forming the side surfaces of the fiber pad lie in planes oriented substantially parallel to the side surfaces.

* * * * *

UNITED STATES PATENT AND TRADEMARK OFFICE
CERTIFICATE OF CORRECTION

PATENT NO.   : 5,955,386
DATED        : 9/21/99
INVENTOR(S)  : Bill D. Horton

It is certified that error appears in the above-identified patent and that said Letters Patent is hereby corrected as shown below:

On the title page: Item [54] and Column 1, lines 1 and 2,

Please delete the title and substitute the following new title:

--FIRE RETARDANT THERMAL AND ACOUSTIC INSULATION MATERIAL--.

Signed and Sealed this

First Day of February, 2000

Attest:

Q. TODD DICKINSON

*Attesting Officer*            *Acting Commissioner of Patents and Trademarks*